United States Patent

Tsuruoka

[15] 3,641,899
[45] Feb. 15, 1972

[54] DEVICE FOR PREVENTING DOUBLE-EXPOSURES IN INTERCHANGEABLE FILM BACK-TYPE CAMERAS

[72] Inventor: Tomio Tsuruoka, Tokyo, Japan
[73] Assignee: Nippon Kogaku K.K., Tokyo, Japan
[22] Filed: Oct. 29, 1969
[21] Appl. No.: 872,190

[30] Foreign Application Priority Data

Oct. 31, 1968 Japan...................................43/94951

[52] U.S. Cl. .........................................95/31 FL, 95/31 AC
[51] Int. Cl. .......................................................G03b 17/42
[58] Field of Search ....................95/34, 31 R, 31 AC, 31 FL, 95/31 OS; 352/72

[56] References Cited

UNITED STATES PATENTS 3,451,322   6/1969   Noda et al. ................................95/31
2,967,471   1/1961   Sommermeyer..........................95/31
2,847,920   8/1958   Polnemus ..................................95/31

*Primary Examiner*—Joseph F. Peters, Jr.
*Assistant Examiner*—Russell E. Adams, Jr.
*Attorney*—Ward, McElhannon, Brooks & Fitzpatrick

[57] ABSTRACT

Upon attachment of a film back having an exposed but unwound film to a camera body its shutter charged, a shutter release button is automatically locked so as to prevent the double-exposure during the film advancement, after which the shutter release button is automatically set free. Thereafter, the device is automatically disconnected from the shutter charging mechanism which also advances the film, so that the shutter may be charged and the film may be advanced in a normal manner.

1 Claim, 4 Drawing Figures

3,641,899

DEVICE FOR PREVENTING DOUBLE-EXPOSURES IN INTERCHANGEABLE FILM BACK-TYPE CAMERAS

The present invention relates to a device for preventing double-exposures owing to faulty operation in interchangeable film back-type cameras.

In a conventional type of interchangeable film back-type camera, the film back, which is provided with a removable rear wall of the camera constructed as an interchangeable roll film magazine can be attached to a camera body only just before or after the shutter mechanism of the camera body is charged while the film is wound up in the film back. In this case, both the camera body and the film back are provided with means indicating that the shutter mechanism is charged and the film has been wound up. The operator therefore attaches the film back to the camera body after checking these indications. However, in another conventional type the film back may be attached to the camera body irrespective of whether the shutter is charged and the film has been advanced. When the film back in which the exposed film is not advanced is attached to the camera body and the shutter release button is accidentally released, the film is double-exposed. In any case the construction is very complicated as two signal means are necessary for indicating that the shutter has been released and the exposed film has been wound up.

In view of the above, the primary object of the present invention is to provide a device for preventing double-exposure owing to faulty operations, in an interchangeable film back-type camera in which the shutter charging and film-winding operation is successively performed by an operational lever.

According to one aspect of the present invention, means is provided for automatically preventing the shutter from being released when the film is being advanced in such a manner that when the film back in which the film has not been wound up is attached to the camera body in which the shutter mechanism has been charged, the shutter release button is automatically locked during the advancement of the film thereby preventing the double-exposure. After the advancement of the film, the shutter release button is automatically set free to be released. Thereafter, the preventive means is disconnected from the shutter charging mechanism and the film advancement mechanism so that the shutter may be released and the film may be advanced in the normal manner.

The above and other objects, features and advantages of the present invention will become more apparent from the following description of one illustrative embodiment of the present invention with reference to the accompanying drawing, in which.

Figure 1:
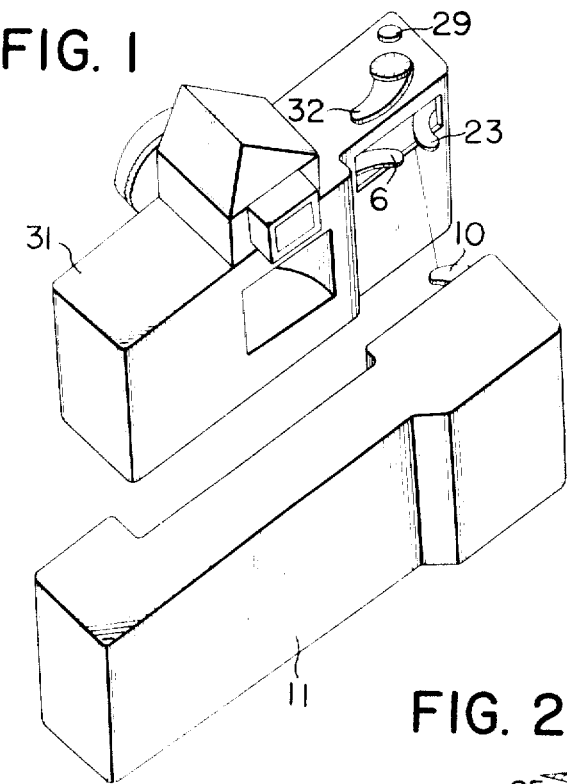
FIG. 1 is a perspective view of one embodiment of the present invention.

A gear 1 is interlocked with a shutter mechanism (not shown) and is in mesh with an intermediate gear 2 having a pin 3 extended from one side surface thereof and being adapted to make approximately one rotation upon release or charge of the shutter mechanism which rotation causes the gear 1 to rotate. A rocking lever 4 which has its intermediate portion pivotably fixed to a camera body is biased in one direction by means of a spring 5. An intermediate lever 6 having its intermediate portion pivotably fixed to the camera body 31 has an engaging pin 7 adapted to engage with the rocking lever 4 and is biased toward the direction of a stop pin 9 fixed to the camera body 31 by means of a spring 8, and is adapted to transmit the movement of the rocking lever 4 to a film-advancement-completion signal generating means 10 (film winding stop lever) to be described in more detail hereinafter.

The film-winding lock lever 10 is pivoted to a shaft 12 which in turn is rotatably disposed within a film back 11 and is normally biased in the counterclockwise direction by means of a spring 13. The film-winding lock lever 10 has at its one end an engaging pawl 10a which engages with the teeth of an upper gear 17 and a lower gear 18 which constitute a dividing mechanism to be described in more detail hereinafter. The other end of the film-winding lock lever 10 is adapted to engage with the intermediate lever 6 and with an interlocking lever 23. A detent pawl 14 fixed to the end of the interlocking shaft 12 remote from the lever 10 engages with a ratchet wheel 16 carried by a shaft which also carries a gear 15 in coaxial relation with the ratchet wheel 16 and is coupled to a film-winding shaft (not shown). Both of the teeth of the upper and lower gears 17 and 18 which are rotated in response to the film-winding operation, constitute the dividing mechanism and have the same pitch. The outer diameter of the lower gear 18 is slightly larger than that of the upper gear 17 which is carried by a shaft 22. The lower gear 18 is rotatably fitted over the shaft 22. A spring stop 19 extends from one side face of the upper gear 17. A spring 21 is loaded between a spring stop 20 extended from one side face of the lower gear 18 and the stop 19 so that the lower gear 18 is normally biased in counterclockwise direction. The spring stop 20 extends through an opening 17a formed in the upper gear 17 in such a manner that the lower gear 18 is deviated by a half pitch with respect to the upper gear 17 as shown in FIGS. 3 and 4.

The interlocking lever 23 pivotably fixed to the camera body 31 has an engaging pin 24 for engagement with a shutter button locking lever 27 and is normally biased toward the direction of a pin 26 fixed to the camera body 31 by means of a spring 25. The shutter button locking lever 27 which is rotatably fixed in coaxial relation with the interlocking lever 23 is normally biased to rotate in the counterclockwise direction by means of a spring 28 extending between the levers 23 and 27 so that upon rotation of the interlocking lever 23 in the counterclockwise direction the leading end portion 27a of the lever 27 is inserted under a shutter button 29 to stop its vertical movement. A spring 30 is provided for returning the shutter button 29 to its normal position or inoperative position.

Next, the operation manner will be described. When the film back in which the film has not been advanced for exposure is attached to the camera body in which the shutter has been charged, the interlocking lever 23 is caused to rotate in the counterclockwise direction by the film-winding stop lever 10 of which the end 10A engages with the periphery of the lower gear 18 as shown in FIG. 4. Concurrently, the shutter button locking lever 27 is caused to rotate in a counterclockwise direction by the spring 28 and the end 27A is inserted under the shutter button 29 so that the end 27a prevents the shutter button 29 from being released. Upon advancement of the film by the winding lever 32, the dividing mechanism is rotated in response to the film-winding operation in the direction indicated by the arrow so that the stop lever 10 is rotated counterclockwise by the spring 13 and the end 10a of the stop lever 10 engages with the teeth of the lower gear 18, thereby stopping its rotation. Next when the teeth of the upper gear 17 coincide with those of the lower gear 18, the pawl 10a of the lever 10 engages both of the teeth of the upper and lower gears 17 and 18, thereby stopping the rotation of the dividing mechanism. In this case, the pawl 14 also engages with the ratchet wheel 16, thereby preventing the film from being wound. Concurrently the stop lever 10 is disengaged from the interlocking lever 23 and, both the interlocking lever 23 and the shutter button locking lever 27 are rotated by the spring 25 in a clockwise direction so that the shutter button 29 is free to be depressed.

Figure 3:
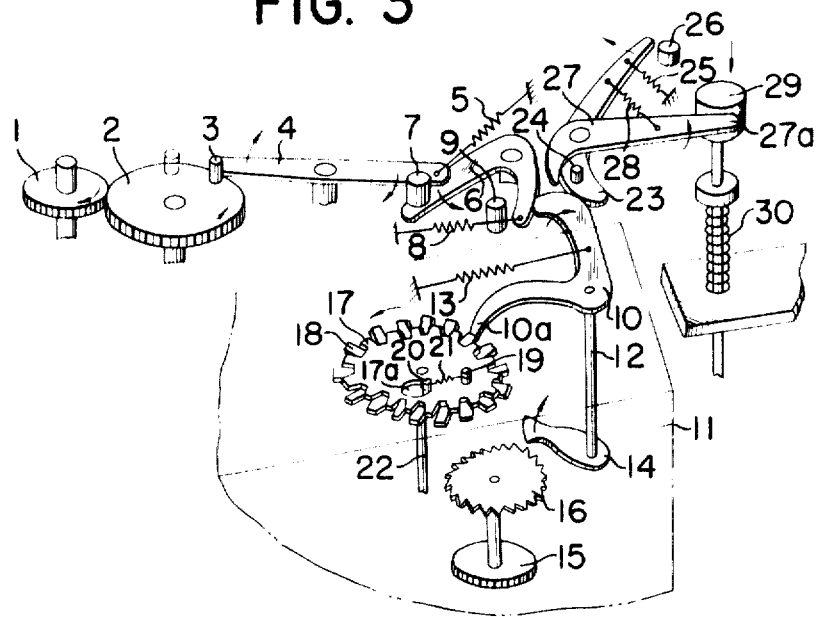
FIG. 3 is for explanation of the shutter release operation.
Figure 4:
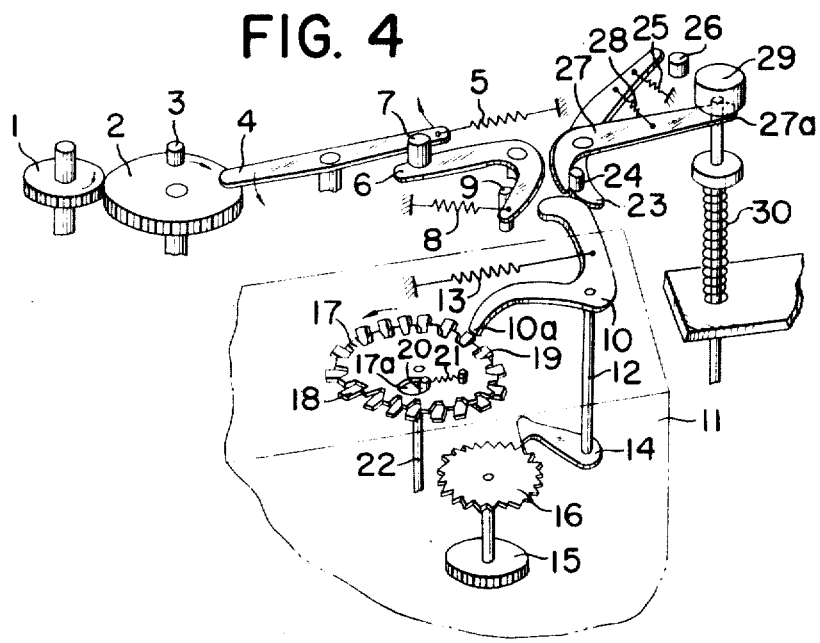
FIG. 4 is for explanation of the state after the shutter has been released.

When the shutter is released by depressing the shutter button as shown in FIG. 3, the gear 1 is rotated in a clockwise direction indicated by the arrow while the intermediate gear 2 is rotated in the counterclockwise direction indicated by the arrow so that the pin 3 causes the rocking lever 4 to rotate in the counterclockwise direction indicated by the arrow, thereby rotating the intermediate lever 6 in the counterclockwise direction indicated by the arrow. Therefore, the film-winding lock lever 10 is rotated by the intermediate lever 6 in the clockwise direction indicated by the arrow so that the engagement of the end 10a with the upper and lower gears 17 and 18 is released. Thus, the lower gear 18 is permitted to rotate in the counterclockwise direction through an angle corresponding to one-half of the pitch of the teeth thereof by means of the spring 31 so that the film-winding lock lever 10 may be held in position shown in FIG. 3 while the pawl 14 is rotated in the clockwise direction indicated by the arrow, thereby permitting the advancement of the film. In this case, the interlocking lever 23 is rotated by the lock lever 10 in the direction indicated by the arrow and is stopped by the depressed shutter button 29. Upon release of the shutter button 29, it is returned to its normal or inoperative position by the spring 30, and the shutter button locking lever 27 is inserted under the shutter release button 29 by spring 28, thereby preventing the release of the shutter release button 29. In this case the pin 3 is further displaced to the starting position as shown by the dotted line so that, the rocking lever 4 is released from the pin 3 and returned to the position indicated in FIG. 4 by the spring 5. The intermediate lever 6 is rotated in the clockwise direction by the spring 8 and is stopped by the stop 9 so that the lever 6 is disconnected from the film-winding lock lever 10.

Figure 2:
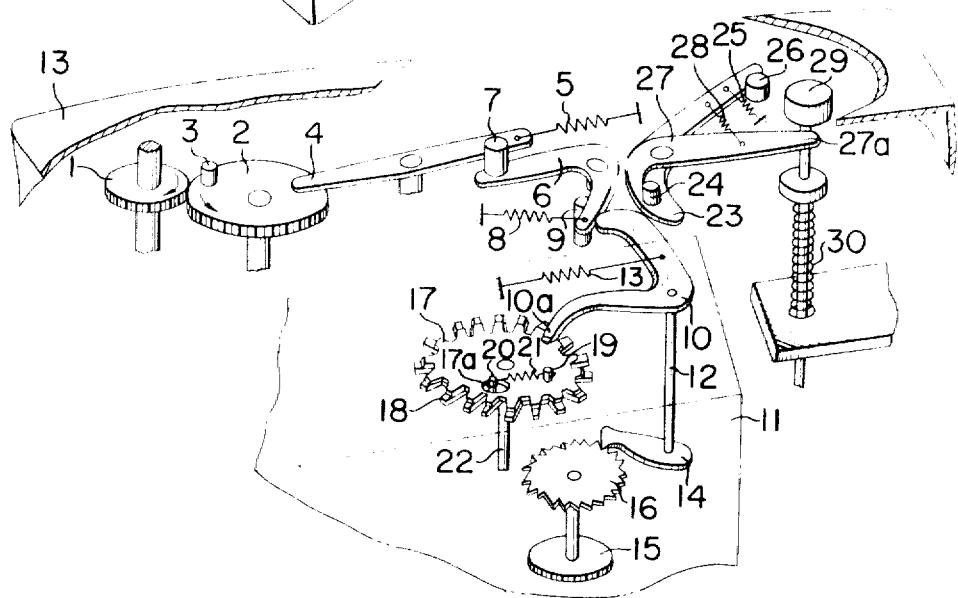
FIG. 2 is perspective exploded view thereof with the film being advanced and the shutter being charged.

Upon actuation of the film-winding lever 32, the gear 1, the intermediate gear 2 and the rocking lever 4 are rotated in the direction indicated by the arrow in FIG. 3, but other mechanisms are not actuated. In this case, the mechanism for shutter charging and for film winding are operated successively in the same manner as described above. Thus, all of the mechanisms are returned to the positions indicated in FIG. 2.

From the foregoing, it is understood that the shutter release button is automatically locked by the signal from the film back even when the film back in which the exposed film has not been wound is attached to the camera body in which the shutter has been charged so that the shutter button is not released, thereby preventing any double-exposure. Furthermore, the device of the present invention is simple in construction.

I claim:
1. A double-exposure prevention device for a camera, having an interchangeable film magazine forming a portion of the backwall of a camera housing, which comprises:
   a shutter button positioned on said housing;
   an operating lever mounted on said housing and adapted to successively wind the film and charge the shutter;
   a drive shaft rotatably mounted in said magazine and engageable with said operating lever;
   a ratchet wheel carried by said drive shaft;
   a detent pawl normally engaging said ratchet;
   an indexing wheel means positioned in said magazine and being rotated in response to the film-winding operation of said operating lever, said indexing means including a pair of toothed wheels;
   a signal lever lockably engaging said detent pawl and having a first arm engageable with the teeth of said indexing means and a second arm projecting through said magazine into said camera;
   a biasing means urging said signal lever toward said indexing means; first and second pivoted levers provided in the camera body and engageable with said second arm of said signal lever, when said magazine is attached to said camera body; said first pivoted lever being moveable in response to shutter operation from a first position to a second position to disengage said signal lever from said indexing wheel means; biasing means urging said second pivoted lever toward said second arm, said second pivoted lever being locked by said second arm when said first pivoted lever is moved to its second position; and
   a locking lever pivoted with said second pivoted lever, said locking lever being inserted under said shutter button when said signal lever is disengaged from said indexing wheel means to lock said shutter button and being retracted from under said shutter button when said signal lever engages said indexing wheel means to permit actuation of said shutter button.

* * * * *